(12) United States Patent
Dumler et al.

(10) Patent No.: US 12,483,801 B2
(45) Date of Patent: Nov. 25, 2025

(54) IMAGE SENSOR, METHOD FOR OPERATING AN IMAGE SENSOR, METHOD FOR MANUFACTURING AN IMAGE SENSOR, AND STATIONARY DEVICE OR VEHICLE OR DRONE HAVING AN IMAGE SENSOR

(71) Applicant: Fraunhofer-Gesellschaft zur Foerderung der angewandten Forschung e.V., Munich (DE)

(72) Inventors: Dietrich Dumler, Munich (DE); Franz Wenninger, Munich (DE); Christoph Kutter, Munich (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 17/940,864

(22) Filed: Sep. 8, 2022

(65) Prior Publication Data

US 2023/0081017 A1   Mar. 16, 2023

(30) Foreign Application Priority Data

Sep. 10, 2021  (DE) .......................... 102021210050.3
Feb. 14, 2022  (DE) ..................... 10 2022 201 523.1

(51) Int. Cl.
*H04N 25/11*   (2023.01)
*B60R 1/24*    (2022.01)
(Continued)

(52) U.S. Cl.
CPC .............. *H04N 25/11* (2023.01); *B60R 1/24* (2022.01); *G02B 5/201* (2013.01); *G02B 5/3025* (2013.01);
(Continued)

(58) Field of Classification Search
CPC ........... H04N 2209/047; H04N 25/135; H04N 25/131
See application file for complete search history.

(56) References Cited

U.S. PATENT DOCUMENTS 5,557,261 A * 9/1996  Barbour ................... B64F 5/20
                                                        250/341.8
8,411,146 B2   4/2013  Twede
(Continued)

FOREIGN PATENT DOCUMENTS

CN   103703769 A   4/2014
CN   207165573 U   3/2018
(Continued)

OTHER PUBLICATIONS

Huber, Daniel F, et al., "A Spectro-polarimetric Imager for Intelligent Transportation Systems", Intelligent Transportation Systems, Oct. 17, 1997 pp. 94-102, XP055101934, Oct. 17, 1997, pp. 94-102.
(Continued)

*Primary Examiner* — Twyler L Haskins
*Assistant Examiner* — Wesley J Chiu
(74) *Attorney, Agent, or Firm* — Perkins Coie LLP; Michael A. Glenn

(57) ABSTRACT

Embodiments of the invention provide an image sensor image sensor including an image sensor structure. The image sensor structure includes a multitude of image elements arranged in a grid-shaped manner in a first direction and in a second direction orthogonal to the first direction. An image element of the multitude of image elements includes a plurality of filter elements spatially arranged side by side. The plurality of filter elements includes at least one color filter and at least one additional filter from a filter group. The filter group includes a first absorption filter with a first optical bandwidth, a second absorption filter with a second optical bandwidth different from the first optical bandwidth, (Continued)

a first polarization filter with a first polarization characteristic, a second polarization filter with a second polarization characteristic different from the first polarization characteristic, and a filter element without absorption effect or polarization effect.

19 Claims, 7 Drawing Sheets

(51) Int. Cl.
| | |
|---|---|
| G02B 5/20 | (2006.01) |
| G02B 5/30 | (2006.01) |
| H04N 25/13 | (2023.01) |
| H04N 25/131 | (2023.01) |
| B64C 39/02 | (2023.01) |
| B64U 101/31 | (2023.01) |

(52) U.S. Cl.
CPC ......... *H04N 25/131* (2023.01); *H04N 25/135* (2023.01); *B64C 39/024* (2013.01); *B64U 2101/31* (2023.01)

(56) References Cited

U.S. PATENT DOCUMENTS

| | | | |
|---|---|---|---|
| 10,823,562 B1* | 11/2020 | Carnahan | G06V 20/56 |
| 11,520,018 B2 | 12/2022 | Baumgartner et al. | |
| 2008/0129541 A1* | 6/2008 | Lu | G06V 20/56 |
| | | | 340/905 |
| 2010/0295947 A1 | 11/2010 | Boulanger | |
| 2011/0149076 A1 | 6/2011 | Capello et al. | |
| 2013/0144490 A1* | 6/2013 | Lord | B60T 17/22 |
| | | | 701/1 |
| 2014/0084404 A1* | 3/2014 | Fukunaga | H10F 39/8053 |
| | | | 257/432 |
| 2015/0070528 A1* | 3/2015 | Kikuchi | H04N 23/95 |
| | | | 348/224.1 |
| 2015/0221691 A1 | 8/2015 | Watanabe | |
| 2015/0339919 A1* | 11/2015 | Barnett | F21S 8/086 |
| | | | 340/907 |
| 2015/0371095 A1 | 12/2015 | Hartmann et al. | |
| 2016/0069743 A1* | 3/2016 | McQuilkin | A22B 5/007 |
| | | | 356/416 |
| 2016/0200161 A1 | 7/2016 | Van Den Bossche et al. | |
| 2016/0358332 A1* | 12/2016 | Watanabe | H04N 9/3176 |
| 2017/0124402 A1 | 5/2017 | Tanaka et al. | |
| 2018/0027191 A2* | 1/2018 | Grauer | H10F 39/8053 |
| | | | 348/164 |
| 2018/0302564 A1 | 10/2018 | Liu et al. | |
| 2019/0188495 A1 | 6/2019 | Zhao et al. | |
| 2019/0188827 A1* | 6/2019 | Mitani | H04N 23/80 |
| 2019/0260974 A1 | 8/2019 | Kaizu et al. | |
| 2019/0306471 A1 | 10/2019 | Otsuki | |
| 2019/0378257 A1* | 12/2019 | Fan | H04N 25/135 |
| 2020/0023995 A1* | 1/2020 | Song | B64U 10/10 |
| 2020/0260055 A1* | 8/2020 | Choi | H04N 23/672 |
| 2020/0280707 A1 | 9/2020 | Briggs et al. | |
| 2020/0286371 A1* | 9/2020 | Yuasa | G08G 1/0116 |
| 2020/0317202 A1 | 10/2020 | Staudacher et al. | |
| 2020/0350353 A1* | 11/2020 | Kurita | H04N 25/134 |
| 2021/0065565 A1* | 3/2021 | Dow | B64C 39/024 |
| 2021/0118931 A1 | 4/2021 | Matsunuma et al. | |
| 2021/0241224 A1* | 8/2021 | Taniguchi | G06Q 10/0833 |
| 2021/0297638 A1* | 9/2021 | Sugiyama | G02B 5/208 |
| 2022/0107266 A1 | 4/2022 | Baumgartner et al. | |
| 2022/0180643 A1* | 6/2022 | Retterath | G06T 7/20 |
| 2022/0185313 A1 | 6/2022 | Wang et al. | |
| 2022/0196545 A1 | 6/2022 | Imawaka et al. | |
| 2023/0049577 A1* | 2/2023 | Gruev | G01J 1/4228 |
| 2023/0314567 A1* | 10/2023 | Dekel | G01S 7/499 |
| | | | 356/4.01 |
| 2024/0155261 A1* | 5/2024 | Iseri | G02B 5/20 |

FOREIGN PATENT DOCUMENTS

| | | |
|---|---|---|
| CN | 110546950 A | 12/2019 |
| CN | 113257000 A | 8/2021 |
| DE | 102009036595 A1 | 2/2011 |
| DE | 102012110092 A1 | 4/2014 |
| DE | 102012110094 A1 | 4/2014 |
| DE | 102014224857 A1 | 6/2016 |
| DE | 102018132525 A1 | 6/2019 |
| DE | 112017005244 T5 | 7/2019 |
| DE | 102019205903 A1 | 10/2020 |
| DE | 112019003967 T5 | 4/2021 |
| EP | 2375755 B1 | 8/2013 |
| EP | 3133646 A2 | 2/2017 |
| JP | 2007232652 A | 9/2007 |
| JP | 2017083352 A | 5/2017 |
| JP | 6161007 B2 | 7/2017 |
| JP | 2018036314 A | 3/2018 |
| JP | 2018098641 A | 6/2018 |
| JP | 2020180924 A | 11/2020 |
| WO | 2010052593 A1 | 5/2010 |
| WO | 2011015196 A1 | 2/2011 |
| WO | 2013018743 A1 | 2/2013 |
| WO | 2013173911 A1 | 11/2013 |
| WO | 2014063701 A1 | 5/2014 |
| WO | 2020198134 A1 | 10/2020 |

OTHER PUBLICATIONS

Misener, James A, "UC Berkeley Working Papers Title Investigation Of An Optical Method To Determine The Presence Of Ice On Road Surfaces", California Path Program, Jan. 1, 1998 pp. 1-20, XP093017038, Jan. 1, 1998, pp. 1-20.

Jonsson, Patrik, et al., "[Uploaded in 2 parts] Road Surface Status Classification Using Spectral Analysis of NIR Camera Images", IEEE Sensors Journal, vol. 15, No. 3, pp. 1641-1656, pp. 1641-1648.

Jonsson, Patrik, et al., "Road Surface Status Classification Using Spectral Analysis of NIR Camera Images (Uploaded in 3 parts)", In: IEEE Sensors Journal, vol. 15, No. 3, 2015, S. 1641-1656.

Wu, Yan, "A Survey of Vision-Based Road Parameter Estimating Methods", Oct. 5, 2020 (Oct. 5, 2020), 20201005, pp. 314-325, XP047567286.

* cited by examiner

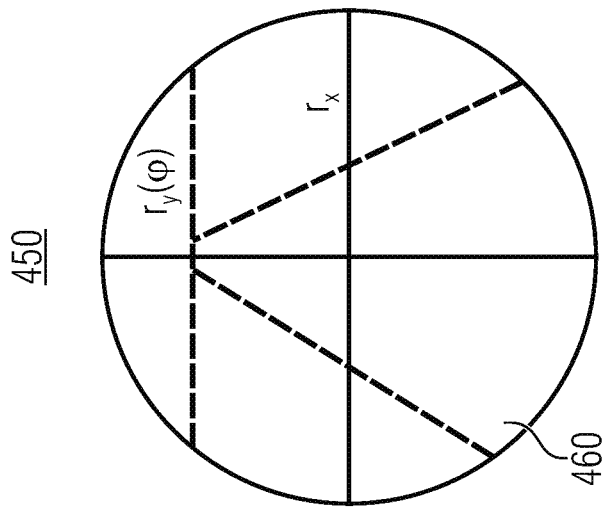
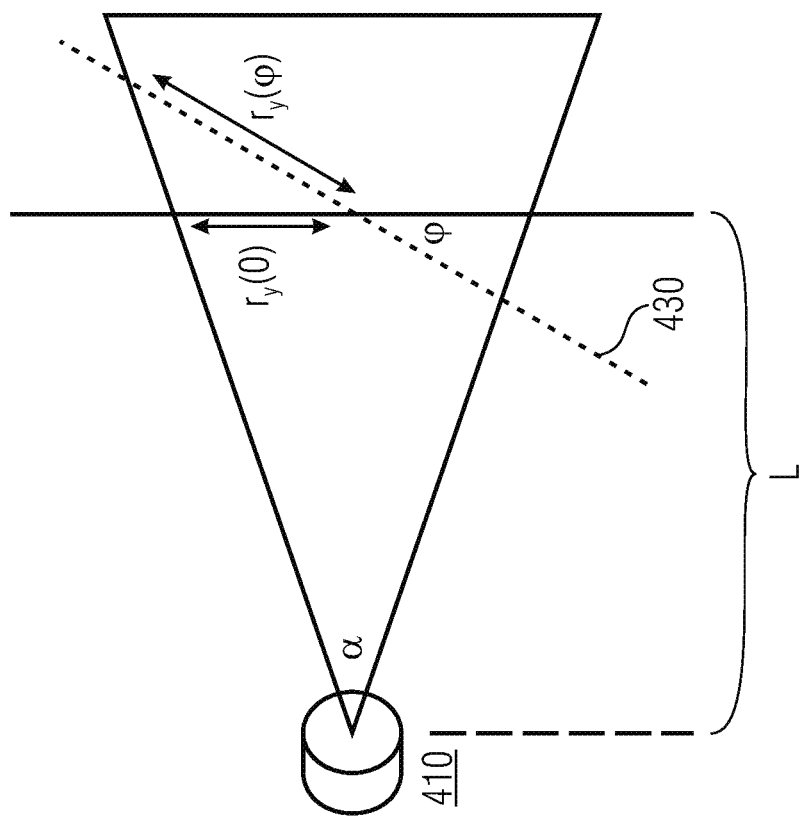
Fig. 4b
Fig. 4a

IMAGE SENSOR, METHOD FOR OPERATING AN IMAGE SENSOR, METHOD FOR MANUFACTURING AN IMAGE SENSOR, AND STATIONARY DEVICE OR VEHICLE OR DRONE HAVING AN IMAGE SENSOR

CROSS-REFERENCE TO RELATED APPLICATION

This application claims priority from German Patent Application No. 10 2022 201 523.1, which was filed on Feb. 14, 2022, and from German Patent Application No. DE 10 2021 210 050.3, which was filed on Sep. 10, 2021, which are both incorporated herein in their entirety by reference.

BACKGROUND OF THE INVENTION

The present application concerns an image sensor having image elements arranged in a grid-shaped manner and comprising a plurality of filter elements.

Detecting road conditions is of essential for safe driving. Modern vehicles estimate general risks of road conditions with the help of sensors, such as optical sensors.

For example, the situation in front of a vehicle is recorded with a camera. For example, on a red-green-blue image (RBG image), it is difficult to differentiate a wet spot from a dirty spot on a road surface since both are just dark. Even though water is transparent, water in RGB images is easily visible due to different effects that change the path of a light beam. Common methods for object detection use RGB data to detect objects such as pedestrians. Objects, such as puddles, with simple shapes and complex optical behavior, such as strong reflections or transparency, are difficult to detect. Environmental variables, such as daylight, background, and underground, change the appearance of weather-caused accumulations, or depositions, significantly, which further complicates the detection.

RGB cameras or RGB image sensors cannot determine the different effects, such as absorption and/or polarization. Thus, the results of the localization and classification method strongly depend on each case and are unreliable.

SUMMARY

According to an embodiment, an image sensor may have: an image sensor structure comprising a multitude of image elements arranged in a grid-shaped manner in a first direction and in a second direction orthogonal to the first direction, wherein an image element of the multitude of image elements comprises a plurality of filter elements spatially arranged side by side, wherein the plurality of filter elements comprises at least one color filter and at least one additional filter from a filter group, and wherein the filter group comprises a first absorption filter with a first optical bandwidth, a second absorption filter with a second optical bandwidth different from the first optical bandwidth, a first polarization filter with a first polarization characteristic, a second polarization filter with a second polarization characteristic different from the first polarization characteristic, and a filter element without absorption effect or polarization effect.

According to another embodiment, a vehicle may have: a vehicle front side directed towards a road surface in a driving direction of the vehicle and extending upwards with respect to the road surface; and an inventive image sensor, attached at the vehicle front side in an upper area of the vehicle front side and orientated in the driving direction.

According to another embodiment, a stationary device may have: a front side directed towards a road surface in a driving direction of a vehicle and extending upwards with respect to the road surface; and an inventive image sensor, attached at the front side in an upper area of the front side and orientated to the driving direction.

Another embodiment may have a drone with an inventive image sensor, wherein the image sensor is configured to be orientated in a driving direction of a road surface.

Another embodiment may have a method for operating an image sensor with an image element structure comprising a multitude of image elements arranged in a grid-shaped manner in a first direction and in a second direction orthogonal to the first direction, wherein an image element of the multitude of image elements comprises a plurality of filter elements spatially arranged side by side, wherein the plurality of filter elements comprises at least one color filter and at least one additional filter from a filter group, wherein the filter group comprises a first absorption filter with a first optical bandwidth, a second absorption filter with a second optical bandwidth different from the first optical bandwidth, a first polarization filter with a first polarization characteristic, a second polarization filter with a second polarization characteristic different from the first polarization characteristic, and a filter element without absorption effect or polarization effect, the method having the steps of: reading out a light-sensitive area associated to the filter; and reading out a further light-sensitive area associated to the additional filter.

Another embodiment may have a method for manufacturing an image sensor with an image element structure comprising a multitude of image elements arranged in a grid-shaped manner in a first direction and in a second direction orthogonal to the first direction, the method having the steps of: configuring the image elements of the multitude of image elements such that each image element comprises a plurality of filter elements spatially arranged side by side, wherein the plurality of filter elements comprises at least one color filter and at least one additional filter from a filter group, wherein the filter group comprises a first absorption filter with a first optical bandwidth, a second absorption filter with a second optical bandwidth different from the first optical bandwidth, a first polarization filter with a first polarization characteristic, a second polarization filter with a second polarization characteristic different from the first polarization characteristic, and a filter element without absorption effect or polarization effect.

Embodiments of the invention provide an image sensor with an image element structure. The image element structure comprises a plurality of image elements arranged in a grid-shaped manner in a first direction and a second direction orthogonal to the first direction.

An image element of the plurality of image elements comprises a plurality of filter elements spatially arranged side by side. The plurality of filter elements comprises at least one color filter and at least one additional filter from a filter group.

The filter group comprises a first absorption filter with a first optical bandwidth, a second absorption filter with a second optical bandwidth different from the first optical bandwidth, a polarization filter with a first polarization characteristic, a second polarization filter with a second polarization characteristic different from the first polarization characteristic, and a filter element without absorption effect or polarization effect.

An image sensor with image elements arranged in a grid-shaped manner, wherein an image element comprises at least one color filter and at least one additional filter, extends a classic camera sensor by further filters. In addition to color information, the inventive image sensor provides additional information such as absorption information and/or polarization information that facilitate a differentiation of an occurrence of water, for example.

The color filter is configured to filter the light in a color-specific manner, and therefore enables the image sensor to detect color information. Often, three color filters are used, since all colors can be mixed from three fundamental colors, such as the colors red, green, and blue. For example, a filter element without absorption effect or polarization effect may replace a color filter from these three color filters in order to save costs.

Absorption information make is possible to more easily find specific materials with certain absorption characteristics in a sensor recording, and sensor recordings with polarization filters make it possible to analyze light beams reflected on a surface.

The inventive image sensor with additional filter elements remains as compact as a classic image sensor, since the extension of the filter elements of the image sensor by additional filter elements only influences the surface and/or the resolution of the image sensor.

With the additional filter elements, the inventive image sensor provides a compact solution that enables improved detection of dangers on a road surface.

In embodiments, the plurality of filter elements comprises an RGB color filter and several different additional filters including a first absorption filter with a first optical bandwidth, a second absorption filter with a second optical bandwidth different from the first optical bandwidth, an first polarization filter with a first polarization characteristic, and a second polarization filter with a second polarization characteristic different from the first polarization characteristic.

An image sensor with an RGB color filter and with several different additional filters, such as with two different absorption filters and two different polarization filters, provides more information than a classic image sensor or an image sensor that includes only one color filter and one additional filter.

For example, the use of two absorption filters with different optical bandwidths in which water has different absorption rates enables a detection of water on a road surface.

On the other hand, the use of two absorption filters with different optical bandwidths in which chlorophyll or nitrogen have different absorption rates enables a detection of plants and/or organic materials or substances.

For example, the use of polarization filters with different polarization angles enables a differentiation between water, snow, and black ice. The reflection of liquid water shows a high polarization ratio of the light with predominantly horizontal orientation, whereas the ice crystals scatter the light beam and cause a rotation of the wave. Ice crystals result in a more strongly scattered polarization with a slightly shifted orientation.

In embodiments, the first optical bandwidth comprises a bandwidth that is selected from a spectral range of between 400 nm and 900 nm. At the same time, the second optical bandwidth comprises a bandwidth that is selected from a spectral range of between 900 nm and 1200 nm.

The above-mentioned selection of the first optical bandwidth and the second optical bandwidth enables between the recordings an optimum intensity difference in areas with water.

In embodiments, the first optical bandwidth comprises at a half-power bandwidth a value of between 820 nm and 870 nm, and the second optical bandwidth comprises at a half-power bandwidth a value of between 920 nm and 970 nm.

An optimum selection of the first optical bandwidth and the second optical bandwidth enables between the recordings a maximum possible intensity difference in areas with water.

In embodiments, the polarization angle of the first polarization filter and the polarization angle of the second polarization filter are dimensioned to be shifted by 90° with respect to each other.

Evenly distributed polarization characteristics, or polarization angles of the polarization filters, provide the largest amount of information about the light beams reflected on the surface. Two polarization filters provide sufficient information about the polarization plane of the light beam.

In embodiments, the image sensor comprises at least one further additional absorption filter and/or polarization filter.

The further additional absorption filter makes it possible to detect further materials such as organic materials or plants, and/or the further additional polarization filter enables an even more precise determination of the polarization of the light beams reflected on the surface.

In embodiments, the at least one color filter of an image element and the at least one additional filter of the image element are arranged side by side in the first direction.

The image sensor of a camera that is orientated in a driving direction records, or captures, the road in a flat angle in a distorted and/or compressed manner. Since the vertical axis is compressed more strongly than the horizontal axis, the resolution in the vertical orientation is more valuable. The filter elements arranged side by side in the first direction provide a maximum vertical resolution in which each image element has only one line.

In embodiments, the at least one color filter and the at least one additional filter are arranged in two lines in the first direction.

The image sensor of a camera that is orientated in a driving direction records the road in a flat angle in a distorted and/or compressed manner. Since the vertical axis is compressed more strongly than the horizontal axis, the resolution in the vertical orientation is more valuable than the resolution in the horizontal orientation. If the number of the filter elements of the image element is higher than a predefined number, for example, the filter elements of the image element may be arranged in two lines in the first direction. Thus, a maximum possible vertical resolution is selectively provided, in which the filter elements of the image element can still record the same part of the road surface.

In embodiments, the at least one color filter belongs to a first stack, and the at least one additional filter belongs to a second stack.

Thus, processing the information is simplified. The filter elements in the first stack detect, similar to the classic camera sensors, the color information. Thus, the color information can be processed with known methods and only the new additional filter elements of the second stack require new image processing methods.

In embodiments, the first stack and the second stack are arranged in two lines side by side in the first direction.

This arrangement enables simplified information processing with a maximum possible vertical resolution.

In embodiments, each image sensor portion associated to one individual filter element in the image element can be selectively read out for each image element.

The inventive image sensor extends a classic camera sensor by additional filter elements. Each image sensor portion associated to an individual filter element in an image element can be selectively read out. Thus, the inventive image sensor can separate the different information.

The image element without absorption effect or polarization effect is configured as an optical all-pass filter or as an opening or hole in a filter layer.

Optical all-pass filters, openings, or holes are the most economic solutions for providing filter elements without absorption effect or polarization effect.

Further embodiments according to the present invention provide vehicles, stationary devices, or drones with an inventive image sensor arranged in a driving direction of a road surface. Here, the image sensor is arranged such that the first direction of the image sensor is arranged transversely to the driving direction, and the second direction of the image sensor is arranged longitudinally to the driving direction. The vehicles, stationary devices, or drones are configured to inform a remote server or a driver about the state, or about a dangerous state, of the road surface.

Further embodiments according to the present invention provide corresponding methods for operating the image sensor and/or for manufacturing the image sensor.

Embodiments according to the present invention provide a camera or an image sensor of a camera for detecting dangers in traffic with increased perception for water on road surfaces.

BRIEF DESCRIPTION OF THE DRAWINGS

Embodiments of the present invention will be detailed subsequently referring to the appended drawings, in which:

FIG. 4a shows a schematic illustration of a camera orientated in the driving direction, having an opening angle/aperture angle α, capturing a road surface, indicated by the dotted line, in a flat angle φ;

FIG. 4b shows a schematic illustration of a sensor recording of the camera in FIG. 4a;

DETAILED DESCRIPTION OF THE INVENTION

Figure 1:
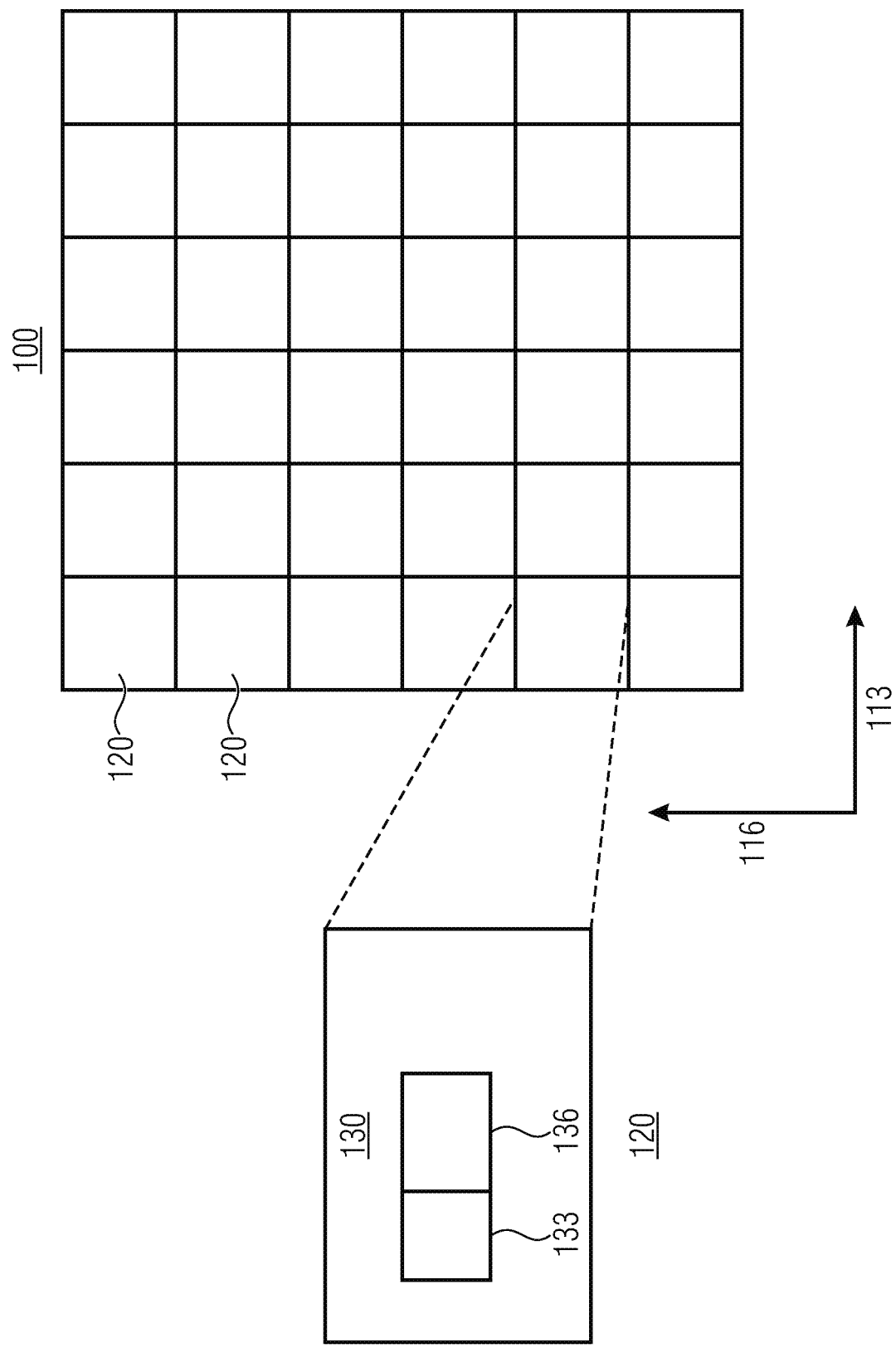
FIG. 1 shows a schematic illustration of an embodiment of an image sensor with image elements arranged in a grid-shaped manner and comprising a plurality of filter elements spatially arranged side by side.

FIG. 1 shows a schematic illustration of an embodiment of an image sensor 100 having a multitude of image elements 120 arranged in a grid-like manner in a first direction 113 and a second direction 116 orthogonal to the first direction 113.

Each image element 120 of the multitude of image elements 120 comprises a plurality of filter elements 130 spatially arranged side by side. The plurality of filter elements 130 comprises at least one color filter 133 and at least one additional filter 136.

The color filter 133 is configured to filter the light in a color-specific manner, and it therefore enables the image sensor 100 to detect color information. One of the most commonly used color filters is the RGB color filter. In this case, the colors red, green, and blue are detected.

For example, the additional filter 136 may comprise an absorption filter, a polarization filter, and/or a filter element without absorption effect or polarization effect. Absorption information makes it possible to more easily find specific materials with certain absorption characteristics in a sensor recording, and sensor recordings with polarization filters make it possible to analyze the light beams reflected on a surface.

For example, the filter element without absorption effect or polarization effect can replace a color filter in a RGB color filter. The color information of the replaced color filter can be calculated with the help of the other color filters, since all other colors can be mixed from three fundamental colors, such as red, green, and blue.

Each image sensor portion associated to an individual filter element in an image element can be selectively read out. Thus, in addition to color information, the inventive image sensor may separately detect additional information, such as absorption information and/or polarization information.

The additional information can simplify a detection of dangers on a road surface. Further possible additional filter elements will be shown in FIG. 2.

Figure 2:
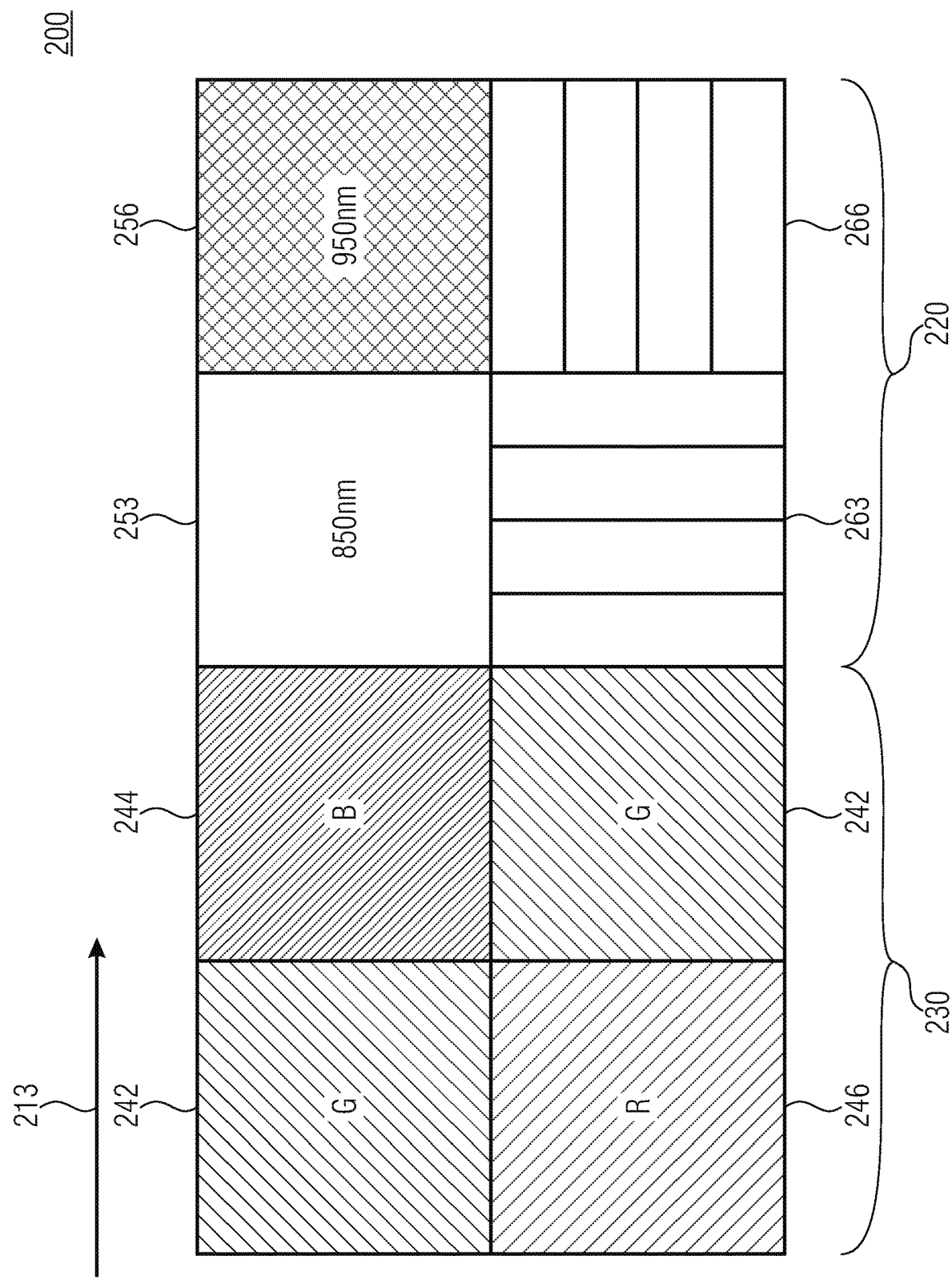
FIG. 2 shows a schematic illustration of an embodiment of a plurality of filter elements of an image element with color filters, two absorption filters with different optical bandwidths, and two polarization filters with different polarization characteristics.

FIG. 2 is a schematic illustration of an embodiment of a plurality of filter elements 200 of an image element, such as the image element 120 in FIG. 1. As is shown in FIG. 1, the plurality of filter elements 200 comprises at least one color filter and at least one additional filter.

The plurality of filter elements 200 comprises a RGB color filter comprising a red filter 246, a blue filter 244, and two green filters 242.

Similar to classic camera sensors, the RGB color filter of the image element is configured to detect color information. Thus, the color information may be processed with known methods.

The plurality of filter elements 200 comprises further additional filters, comprising a first absorption filter 253 with a bandwidth of 850 nm, or a half-power bandwidth of between 820 nm and 870 nm, a second absorption filter 256 with a bandwidth of 950 nm, or a half-power bandwidth of between 920 nm and 970 nm, a first polarization filter 263 with a vertical orientation, and a second polarization filter 266 with a horizontal orientation.

The bandwidths of the first and the second absorption filters 253, 256 are selected to utilize the absorption characteristic of water and to thereby simplify the detection of an occurrence of water. Thus, the first and the second absorption filters 253, 256 provide different intensity values in areas with water.

Optionally, the camera or the image sensor of the camera may be supplemented by further filters. It is possible to use additional absorption filters with different optical bandwidths in which chlorophyll or nitrogen have different absorption rates to detect plants and/or organic materials or substances. A particularly strong absorption of chlorophyll is detected with absorption filters with a bandwidth of 450 nm and 650 nm. The detection of nitrogen requires absorption filters with a bandwidth of 740 nm, 820 nm, and 860 nm. Nitrogen can be found in organic materials, substances or in plants.

Polarization filters make it possible to analyze the light beams reflected on the surface and to therefore differentiate the different occurrences of water. For example, a high polarization ratio with predominantly horizontal orientation indicates liquid water, whereas a more strongly scattered polarization with a slightly shifted orientation indicates ice.

A use of an additional polarization filter with a polarization angle of 45° enables an even more precise determination of the polarization.

The color filters 242, 244, 246 belong to a first stack 230, and the additional filters 253, 256, 263, 266 belong to a second stack 220. The filter elements of the first stack 230 and the second stack 220 are arranged in two lines side by side in the first direction 213.

The filter elements of the image sensor are arranged in one line or in two lines in the first direction side by side to achieve a maximum vertical resolution. The resolution of the vertical orientation is more valuable than the resolution in the horizontal orientation, as is explained in FIG. 3.

Figure 3:
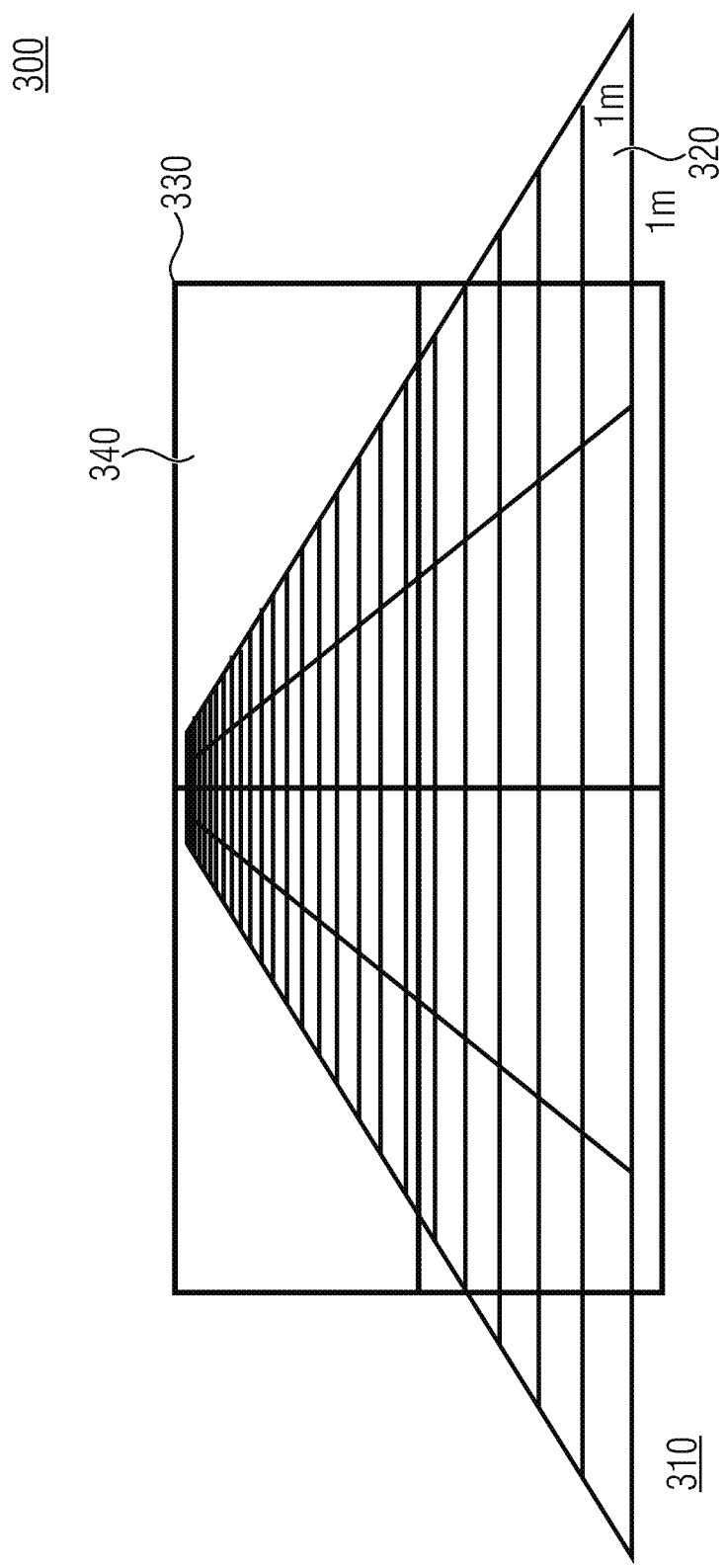
FIG. 3 shows a schematic perspective illustration of a road surface with a grid pattern and a frame representing a sensor recording of the road surface.

FIG. 3 shows a schematic perspective illustration 300 of a road surface 310 with a grid pattern. Each box 320 of the grid pattern represents a square area of 1 m×1 m on the road surface 310.

FIG. 3 shows a frame 330. The image information within the frame represents a sensor recording 340, such as a sensor recording 340 of the image sensor 100 in FIG. 1. The sensor recording 340 shows that the road portions or the boxes 320 of the sensor recording 340 are distorted.

It is clearly visible that the plane of the road surface 310 in the sensor recording 340 is distorted and compressed. The vertical axis is compressed more heavily than the horizontal axis and, therefore, the resolution in the vertical orientation is more valuable than the resolution in the horizontal orientation.

The degree of the ratio between the vertical axis and the horizontal axis depends on the angle of the camera or of the camera sensor with respect to the road surface 310, as is explained in FIGS. 4a, 4b.

FIG. 4a shows a schematic illustration of a camera 410 directed in the driving direction, having an aperture angle α, recording a road surface, illustrated by the dotted line 430, in a flat angle φ. At an angle of φ=90°, the camera 410 or the viewing direction of the camera 410 is parallel to the road surface. If the viewing direction of the image sensor 410 or the camera 420 is perpendicular (φ=0°) to the road surface, the camera sees in a distance L from the road surface an undistorted road portion having a length of 2·r$_y$(0).

If the angle φ is larger than 0° and smaller than 90° (0°<φ<90°), the sensor recording, such as the sensor recording 340 in FIG. 3, shows a longer road portion, i.e. a road portion having a length of 2·r$_y$(φ). FIG. 4 shows that the distortion of the vertical axis of a sensor recording depends on the angle of the viewing direction of the camera with respect to the road surface.

FIG. 4b shows a schematic illustration of a sensor recording 450 of the camera 410 in FIG. 4. The sensor recording 450 shows a schematic illustration of a road surface 460. The width of the road surface 460 is compressed with the distance from the camera.

The sensor recording 450 shows that the degree of distortion (g or g(φ)) of the vertical and the horizontal axis is the ratio between the vertical and horizontal lengths r$_y$(φ) and r$_x$ indicated in the sensor recording 450.

The degree of distortion of the axes x and y as a function of the angle of the viewing direction of the camera with respect to the road surface may be calculated with the following equation and illustrated in a diagram:

$$g(\varphi) = \frac{r_y(\varphi)}{r_x} = \frac{\cos(\alpha)}{\sin\left(\frac{\pi}{2} - \varphi - \alpha\right)}.$$

Figure 5:
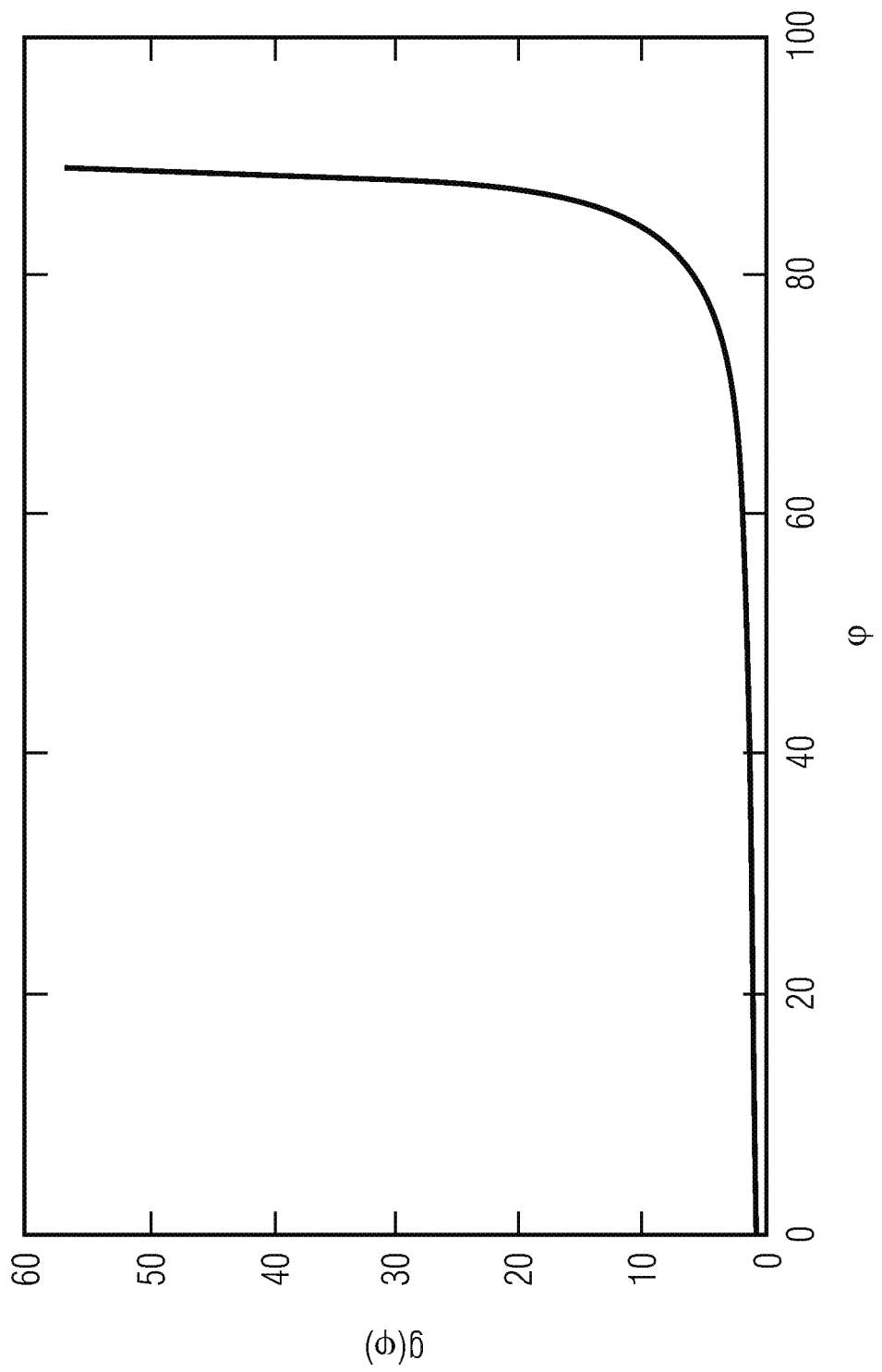
FIG. 5 shows a diagram with the characteristic line of the distortion of the axes x and y as a function of the observation angle φ.

FIG. 5 shows a diagram with the characteristic line of the distortion of the axes x and y as a function of the observation angle φ.

FIG. 5 may be interpreted such that the y axis is much more compressed than the x axis with an increasingly flat camera angle (φ~0; camera is parallel to the road surface). In the case of too much compression, an object in the recorded image is reduced to less than a pixel, which is subsequently no longer illustrated, and the object can no longer be detected. This effect is minimized by the inventive image sensor with a maximum possible vertical resolution and a steep camera angle.

Figure 6:
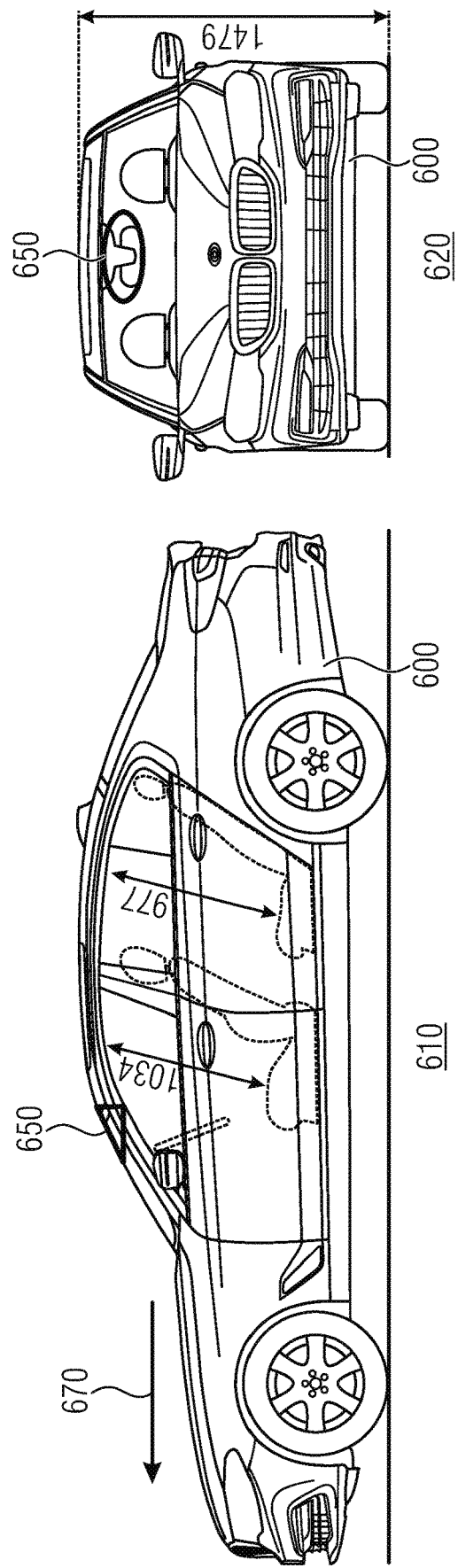
FIG. 6 shows a schematic illustration of an embodiment of a vehicle having the inventive image sensor.

In order to keep the camera angle as steep as possible, the camera, as is shown in FIG. 6, is attached at the highest possible point in a vehicle.

FIG. 6 shows a side view 610 and a front view 620 of a vehicle 600 with an inventive image sensor 650 orientated in the driving direction 670 of the vehicle 600.

For example, at an installation height of approximately 1400 mm and a desired minimum range of 50 m, the camera angle with respect to the road is approximately 88.4°, corresponding to an axis ratio of approximately 1:35 for the area 50 m away from the camera. This means that the resolution in the vertical orientation is only 1/35 of the horizontal resolution, and that the resolution in the vertical orientation is therefore more valuable. The filter mosaic or the plurality of filter elements is therefore extended in a flat structure to ensure a highest possible vertical resolution. Possible filter element structures are filter elements arranged in one line (1×N) or in two lines (2×N).

Figure 7B:
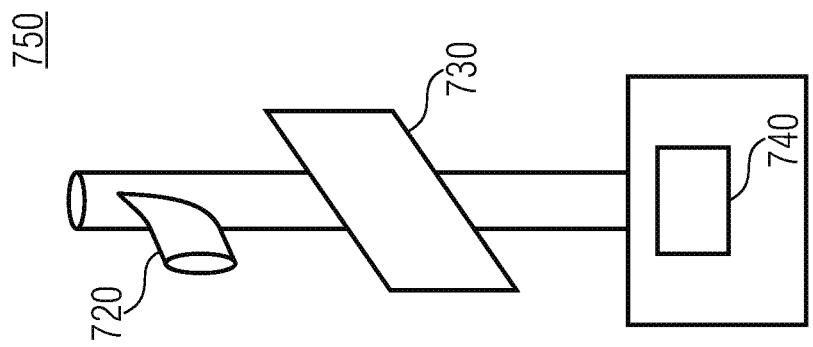
FIG. 7b shows a schematic illustration of an embodiment of a stationary device.
Figure 7A:
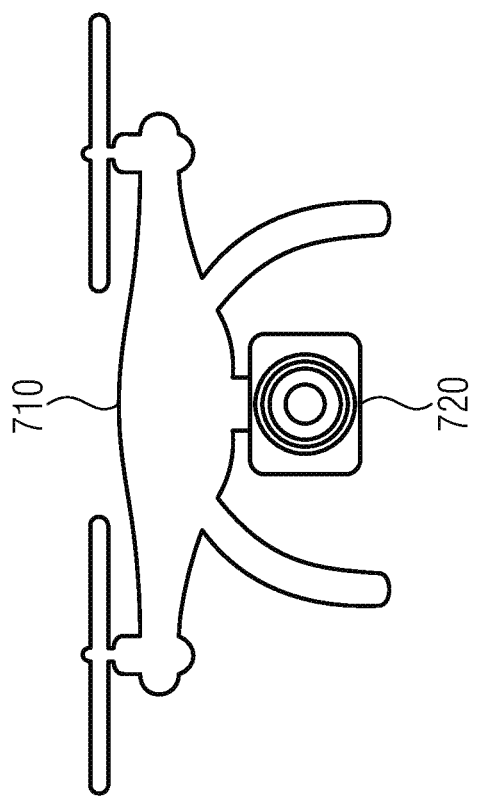
FIG. 7a shows a schematic illustration of an embodiment of a drone.

In addition to vehicles, stationary devices or drones can be equipped with the inventive image sensor, as is explained in FIGS. 7a, 7b.

FIG. 7a shows a drone 710 with an image sensor 720.

Here, the inventive image sensor 720 may be orientated in a driving direction of a road surface. The image sensor 720 is arranged such that the first direction of the image sensor is arranged transversally to the driving direction, and the second direction of the image sensor is arranged longitudinally to the driving direction. The drone is configured to inform a remote server about the state, or about a dangerous state, of the road surface.

FIG. 7b shows a stationary device 750 with an image sensor 720, a display 730, and a processor 740.

The inventive image sensor 720 may be orientated in a driving direction of a road surface. The image sensor 720 is arranged such that the first direction of the image sensor 720 is arranged transversally to the driving direction, and the second direction of the image sensor 720 is arranged longitudinally to the driving direction.

The processor 740 is configured to estimate a state of the road surface on the basis of the sensor recording of the image sensor 720, and to inform a driver with the help of the display 730 about the state, or about a dangerous state, of the road surface.

Additionally or alternatively, the device 750 may be configured to inform a remote server about the state, or about a dangerous state, of the road surface.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device. Some or all of the method steps may be performed by a hardware device (or using a hardware device). In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded.

A further embodiment of the inventive method thus is a data stream or a sequence of signals representing the computer program for performing any of the methods described herein. The data stream or the sequence of signals may be configured, for example, to be transmitted via a data communication link, for example via the internet.

A further embodiment includes a processing unit, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Image sensor comprising:
   an image sensor structure comprising a multitude of image elements arranged in a grid-shaped manner in a first direction and in a second direction orthogonal to the first direction,
   wherein each image element of the multitude of image elements comprises a first stack of filter elements and a second stack of filter elements, wherein the second stack of filter elements is arranged side by side with the first stack of filter elements in the first direction,
   wherein each one of the first stack of filter elements and the second stack of filter elements comprises a plurality of filter elements spatially arranged side by side,
   wherein the plurality of filter elements of the first stack of filter elements and the plurality of filter elements of the second stack of filter elements are extended in a flat structure in which filter elements of the first stack of filter elements and filter elements of the second stack of filter elements are arranged in one line or in two lines,
   wherein the first stack of filter elements comprises at least a first color filter, a second color filter, and a third color filter, wherein the third color filter is different from the first color filter and the second color filter, and wherein the first color filter is different from the second color filter,
   wherein the second stack of filter elements comprises a first absorption filter with a first optical bandwidth, wherein the first optical bandwidth is selected from a spectral range of between 900 nm and 1200 nm, a second absorption filter with a second optical bandwidth, wherein the second optical bandwidth is selected from a spectral range of between 400 nm and 900 nm and is different from the first optical bandwidth, a first polarization filter with a first polarization characteristic, and a second polarization filter with a second polarization characteristic different from the first polarization characteristic,
   wherein the first absorption filter and the second absorption filter have optical bandwidths in which water has different absorption rates in order to detect water on a road surface, and wherein the first polarization filter with a first polarization characteristic, and the second polarization filter with the second polarization characteristic have different polarization characteristics in order to differentiate between water, snow, and black ice.

2. Vehicle, comprising:
a vehicle front side directed towards a road surface in a driving direction of the vehicle and extending upwards with respect to the road surface; and
an image sensor according to claim 1, attached at the vehicle front side in an upper area of the vehicle front side and oriented in the driving direction.

3. The vehicle according to claim 2, wherein the image sensor is arranged such that the first direction of the image sensor structure is arranged transversally to the driving direction, and such that the second direction of the image sensor structure is arranged longitudinally to the driving direction, wherein the second stack is placed adjacent to the first stack in the first direction being transversally to the driving direction.

4. Stationary device, comprising:
a front side directed towards a road surface in a driving direction of a vehicle and extending upwards with respect to the road surface; and
an image sensor according to claim 1, attached at the front side in an upper area of the front side and oriented to the driving direction.

5. The stationary device according to claim 4, wherein the image sensor is arranged such that the first direction of the image sensor structure is arranged transversally to the driving direction, and such that the second direction of the image sensor structure is arranged longitudinally to the driving direction, wherein the second stack is placed adjacent to the first stack in the first direction being transversally to the driving direction.

6. The stationary device according to claim 4, wherein the stationary device further comprises a processor, and a display,
wherein the processor is configured to estimate a state of the road surface on the basis of a sensor recording of the image sensor; and
wherein the display is configured to inform a driver of the vehicle about the state of the road surface, or to inform a driver of the vehicle about a dangerous state of the road surface.

7. The stationary device according to claim 4, wherein the stationary device is configured to inform a remote server about a state of the road surface, or to inform a remote server about a dangerous state of the road surface.

8. Drone with an image sensor according to claim 1, wherein the image sensor is configured to be oriented in a moving direction relative to a road surface.

9. The drone according to claim 8, wherein the image sensor is arranged such that the first direction of the image sensor structure is arranged transversally to the moving direction, and such that the second direction of the image sensor structure is arranged longitudinally to the moving direction, wherein the second stack is placed adjacent to the first stack in the first direction being transversally to the moving direction.

10. The drone according to claim 8, wherein the drone is configured to inform a remote server about a state of the road surface, or to inform a remote server about a dangerous state of the road surface.

11. The image sensor according to claim 1, wherein the first stack of filter elements comprises, as the first color filter, a red color filter, as the second color filter, a green color filter, and, as the third color filter, a blue color filter.

12. The image sensor according to claim 1, wherein the second optical bandwidth of the second absorption filter comprises, at a half-power bandwidth, a value of between 820 nm and 870 nm, and wherein the first optical bandwidth of the first absorption filter comprises, at the half-power bandwidth, a value of between 920 nm and 970 nm.

13. The image sensor according to claim 1,
wherein the first stack of filter elements comprises: a green filter, a blue filter placed adjacent to the green filter in the first direction, a red filter adjacent to the green filter in the second direction, and another green filter adjacent to the red filter in the first direction and adjacent to the blue filter in the second direction, and,
wherein the second stack comprises: the first absorption filter, the second absorption filter, the first polarization filter and the second polarization filter, wherein the second absorption filter is placed adjacent to the first absorption filter in the first direction, the first polarization filter is placed adjacent to the first absorption filter in the second direction, and the second polarization filter is placed adjacent to the first polarization filter in the first direction and adjacent to the first second absorption filter in the second direction.

14. The image sensor according to claim 13, wherein the first stack and the second stack are arranged in two lines side by side in the first direction,
wherein the second absorption filter of the second stack is arranged adjacent to the blue filter of the first stack in the first direction, and
wherein the first polarization filter of the second stack is placed adjacent to the further green filter of the first stack in the first direction.

15. The image sensor according to claim 1, wherein the polarization characteristic of the first polarization filter and the polarization characteristic of the second polarization filter are configured to be shifted by 90° with respect to each other.

16. The image sensor according to claim 1, wherein the first stack of filter elements and the second stack of filter elements are arranged in two lines side by side in the first direction.

17. The image sensor according to claim 1, wherein the image sensor is configured to selectively read out each image sensor portion associated to each individual filter element of the first stack of filter elements and the second stack of filter elements in the image element.

18. Method for operating an image sensor with an image element structure comprising a multitude of image elements arranged in a grid-shaped manner in a first direction and in a second direction orthogonal to the first direction, wherein each image element of the multitude of image elements comprises a first stack of filter elements and a second stack of filter elements, arranged side by side with the first stack of filter elements in the first direction, wherein each one of the first stack of filter elements and the second stack of filter elements comprises a plurality of filter elements spatially arranged side by side, wherein the plurality of filter elements of the first stack of filter elements and the plurality of filter elements of the second stack of filter elements are extended in a flat structure in which filter elements of the first stack of filter elements and filter elements of the second stack of filter elements are arranged in one line or in two lines, wherein the first stack of filter elements comprises at least a first color filter, a second color filter, and a third color filter, wherein the third color filter is different from the first color filter and the second color filter, and wherein the first color filter is different from the second color filter, wherein the second stack of filter elements comprises a first absorption filter with a first optical bandwidth, wherein the first optical bandwidth is selected from a spectral range of between 900 nm and 1200 nm, a second absorption filter with a second optical bandwidth, wherein the second optical bandwidth is selected from a spectral range of between 400 nm and 900 nm and is different from the first optical bandwidth, a first polarization filter with a first polarization characteristic, and a second polarization filter with a second polarization characteristic different from the first polarization characteristic, the method comprising:

reading out a first light-sensitive area associated to the first and second color filters of the first stack of filter elements; and reading out a second light-sensitive area associated to the first absorption filter, the second absorption filter, the first polarization filter, and the second polarization filter, wherein the first absorption filter and the second absorption filter have optical bandwidths in which water has different absorption rates in order to detect water on a road surface, and wherein the first polarization filter with a first polarization characteristic, and the second polarization filter with the second polarization characteristic have different polarization characteristics in order to differentiate between water, snow, and black ice.

19. Method for manufacturing an image sensor with an image element structure comprising a multitude of image elements arranged in a grid-shaped manner in a first direction and in a second direction orthogonal to the first direction, the method comprising:

configuring the image elements of the multitude of image elements such that each image element of the multitude of image elements comprises a first stack of filter elements and a second stack of filter elements, wherein the second stack of filter elements is arranged side by side with the first stack of filter elements in the first direction, wherein each one of the first stack of filter elements and the second stack of filter elements comprises a plurality of filter elements spatially arranged side by side, wherein the plurality of filter elements of the first stack of filter elements and the plurality of filter elements of the second stack of filter elements are extended in a flat structure in which filter elements of the first stack of filter elements and filter elements of the stack of filter elements are arranged in one line or in two lines, wherein the first stack of filter elements comprises at least a first color filter, a second color filter, and a third color filter, wherein the third color filter is different from the first color filter and the second color filter, and wherein the first color filter is different from the second color filter, wherein the second stack of filter elements comprises a first absorption filter with a first optical bandwidth, wherein the first optical bandwidth is selected from a spectral range of between 900 nm and 1200 nm, a second absorption filter with a second optical bandwidth, wherein the second optical bandwidth is selected from a spectral range of between 400 nm and 900 nm and is different from the first optical bandwidth, a first polarization filter with a first polarization characteristic, and a second polarization filter with a second polarization characteristic different from the first polarization characteristic, wherein the first absorption filter and the second absorption filter have optical bandwidths in which water has different absorption rates in order to detect water on a road surface, and wherein the first polarization filter with a first polarization characteristic, and the second polarization filter with the second polarization characteristic have different polarization characteristics in order to differentiate between water, snow, and black ice.

\* \* \* \* \*